(12) United States Patent
Yoshida et al.

(10) Patent No.: US 9,982,084 B2
(45) Date of Patent: May 29, 2018

(54) SURFACE TREATMENT COMPOSITION

(71) Applicant: DAIKIN INDUSTRIES, LTD., Osaka-shi, Osaka (JP)

(72) Inventors: Tomohiro Yoshida, Settsu (JP); Saya Yokotani, Settsu (JP); Hisashi Mitsuhashi, Settsu (JP); Kakeru Hanabusa, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days. days.

(21) Appl. No.: 15/029,867

(22) PCT Filed: Oct. 16, 2014

(86) PCT No.: PCT/JP2014/077567
§ 371 (c)(1),
(2) Date: Apr. 15, 2016

(87) PCT Pub. No.: WO2015/056744
PCT Pub. Date: Apr. 23, 2015

(65) Prior Publication Data
US 2016/0237199 A1     Aug. 18, 2016

(30) Foreign Application Priority Data

Oct. 18, 2013   (JP) ................................ 2013-217425
May 28, 2014   (JP) ................................ 2014-110549

(51) Int. Cl.
| | | |
|---|---|---|
| C09D 183/14 | (2006.01) |
| C08G 18/67 | (2006.01) |
| C08F 290/06 | (2006.01) |
| C08G 18/79 | (2006.01) |
| C08G 18/28 | (2006.01) |
| C09D 175/16 | (2006.01) |
| G02B 1/18 | (2015.01) |
| C08G 18/38 | (2006.01) |
| C08G 18/50 | (2006.01) |

(52) U.S. Cl.
CPC .......... C08G 18/672 (2013.01); C08F 290/06 (2013.01); C08G 18/2885 (2013.01); C08G 18/3893 (2013.01); C08G 18/5015 (2013.01); C08G 18/792 (2013.01); C09D 175/16 (2013.01); C09D 183/14 (2013.01); G02B 1/18 (2015.01)

(58) Field of Classification Search
None
See application file for complete search history.

(56) References Cited

U.S. PATENT DOCUMENTS

| | | | | |
|---|---|---|---|---|
| 2004/0181008 A1* | 9/2004 | Hanazawa | ......... | C08G 18/2885 524/589 |
| 2008/0160257 A1* | 7/2008 | Takada | ................... | C08J 7/04 428/145 |
| 2011/0135905 A1* | 6/2011 | Wakita | .................. | C08F 283/12 428/221 |
| 2012/0107605 A1* | 5/2012 | Ozawa | .................... | C08J 7/045 428/329 |
| 2015/0118504 A1* | 4/2015 | Ohshita | .................... | C09D 7/12 428/447 |

FOREIGN PATENT DOCUMENTS

| | | |
|---|---|---|
| EP | 0 844 265 A1 | 5/1998 |
| JP | 2004-291303 A | 10/2004 |
| JP | 2006-37024 A | 2/2006 |
| JP | 2010-152331 A | 7/2010 |
| WO | 97/07155 A1 | 2/1997 |
| WO | 03/002628 A1 | 1/2003 |
| WO | WO 2013146110 A1 * | 10/2013 ............... C09D 7/12 |

OTHER PUBLICATIONS

International Preliminary Report on Patentability for PCT/JP2014/077567 dated Apr. 19, 2016.
International Search Report for PCT/JP2014/077567 dated Jan. 20, 2015 [PCT/ISA/210].

* cited by examiner

*Primary Examiner* — Robert S Loewe
(74) *Attorney, Agent, or Firm* — Sughrue Mion, PLLC

(57) ABSTRACT

A composition including a compound containing a carbon-carbon double bond obtained by reacting (A) a polyisocyanate which is a trimer of diisocyanate, with (B) a compound having an active hydrogen, wherein component (B) includes: (B1) a perfluoropolyether having an active hydrogen, (B2) a silane compound having an active hydrogen, and (B3) a monomer having an active hydrogen and a carbon-carbon double bond. Further, a molar amount of an isocyanate group in component (A) is equal to a total molar amount of component (B), and a molar amount of component (B1), component (B2) and component (B3) per 9 moles of the isocyanate group in component (A) are component (B1) 0.1-2 moles, component (B2) 0.05-2 moles, and component (B3) 5-8.85 moles, respectively.

26 Claims, No Drawings

SURFACE TREATMENT COMPOSITION

CROSS REFERENCE TO RELATED APPLICATIONS

This application is a National Stage of International Application No. PCT/JP2014/077567, filed on Oct. 16, 2014, which claims priority from Japanese Patent Application No. 2013-217425, filed on Oct. 18, 2013 and Japanese Patent Application No. 2014-110549, filed on May 28, 2014, the contents of all of which are incorporated herein by reference in their entirety.

TECHNICAL FIELD

The present invention relates to a composition comprising a perfluoropolyether compound containing a carbon-carbon double bond.

BACKGROUND ART

A certain fluorine-containing silane compound is known to be able to provide excellent water-repellency, oil-repellency, antifouling property, or the like when it is used on a surface treatment of a base material. A layer formed from the surface treatment agent comprising a fluorine-containing silane compound is applied to various base materials such as a glass, a plastic, a fiber and a building material as a so-called functional thin film.

Conventionally, in particular, in an application to an optical member, a base material formed of an inorganic glass has been used. In order to prevent adhering of a fouling such as fingerprints, a layer is formed by using a fluorine containing compound on the base material as an antifouling coating. As such fluorine containing compound, a surface treatment agent comprising a fluorine containing silane compound having a perfluoropolyether group and a hydroxyl group or a hydrolyzable group which binds to Si as an active ingredient is known (Patent Literature 1). However, in this case, since a bonding between a silanol group and a hydroxyl group are used, the base material is limited to glass, silicon, a metal oxide film, or the like.

On the other hand, recently, use of transparent plastics such as an acrylic resin, polycarbonate, and the like has been expanded as a material in place of the inorganic glass since they are lightweight, chip-proof and easily processable. It is desired to form the antifouling coating also when the resin material is used. However, since the fluorine containing silane compound as described in Patent Literature 1 is not conformable to the base material formed of the resin material, it is hard to fix on the surface of the base material. As a method of forming a layer less subjected to peeling on a surface of a base material formed of various materials such as resin, for example, Patent Literature 2 discloses a method using a composition containing a carbon-carbon double bond, which comprises (A) a triisocyanate prepared by trimerizing a diisocyanate, and (B) a combination of at least two active hydrogen-containing compounds wherein the component (B) comprises (B-1) a perfluoropolyether having at least one active hydrogen, and (B-2) a monomer having an active hydrogen and a carbon-carbon double bond.

PRIOR ART LITERATURE

Patent Literature

Patent Literature 1: WO 97/07155 A
Patent Literature 2: WO 2003-002628 A

SUMMARY OF THE INVENTION

Problem to be Solved by the Invention

Recently, under a circumstance where a smartphone and a tablet terminal spread rapidly, with respect to use of a touch panel, it is desired to provide excellent touch sense when users touch to and operate the display panel with their finger, i.e. excellent surface slip property and durability capable of maintaining the surface slip property (specifically, friction durability) for a long time.

In addition, a fluoro-backbone such as perfluoropolyether is slightly soluble in a fluorine-free solvent such as a ketone solvent or an ester solvent, therefore, requires an expensive fluorine solvent. Therefore, a surface treatment composition having high solubility in the fluorine-free solvent such as the ketone solvent or the ester solvent is desired.

However, the conventional composition cannot necessarily satisfy the increased requirements described above.

An object of the present invention is to provide a composition which is useful to form a layer having excellent surface slip property and friction durability in addition to water-repellency, oil-repellency and antifouling property on a base material consisting of various materials comprising a resin and a surface treatment agent comprising the composition. Preferably, an object of the present invention is to provide a composition having high solubility in a general purpose solvent and a surface treatment agent comprising the composition.

Means to Solve the Problem

As a result of intensively studying, the inventors of the present invention have found that in the composition of Patent Literature 2, by using further a silane compound having an active hydrogen as component (B), and setting a molar ratio of component (B) to be reacted with component (A) within the specific range, a layer having excellent surface slip property and friction durability in addition to water-repellency, oil-repellency and antifouling property can be formed on a surface of a base material, and the inventors complete the present invention.

Therefore, according to the first aspect of the present invention, there is provided a composition comprising a compound containing a carbon-carbon double bond obtained by reacting (A) a polyisocyanate which is a trimer of diisocyanate, with
(B) a compound having an active hydrogen, wherein component (B) comprises:
(B1) a perfluoropolyether having an active hydrogen,
(B2) a silane compound having an active hydrogen, and
(B3) a monomer having an active hydrogen and a carbon-carbon double bond a molar amount of an isocyanate group in component (A) is equal to a total molar amount of component (B), and a molar amount of component (B1), component (B2) and component (B3) per 9 moles of the isocyanate group in component (A) are component (B1) 0.1-2 moles,
component (B2) 0.05-2 moles, and
component (B3) 5-8.85 moles, respectively.

According to the second aspect of the present invention, there is provided a surface treatment composition comprising one or more compositions described above.

According to the third aspect of the present invention, there is provided a curable composition comprising one or more compositions described above or one or more surface treatment compositions described above; and a matrix forming composition.

According to the fourth aspect of the present invention, there is provided an article comprising a base material and a layer which is formed on a surface of the base material from the surface treatment composition described above or the curable composition described above.

Effect of the Invention

According to the present invention, by reacting (A) a polyisocyanate which is a trimer of diisocyanate with a specific amount of (B1) a perfluoropolyether having an active hydrogen, (B2) a silane compound having an active hydrogen, and (B3) a monomer having an active hydrogen and a carbon-carbon double bond, a composition which can provide a layer (hereinafter, referred to as a "surface-treating layer") having water-repellency, oil-repellency and antifouling property as well as excellent surface slip property and friction durability can be provided.

Embodiments to Carry out the Invention

Hereinafter, the composition of the present invention will be described.

The composition of the present invention is preferably used in a treatment of a surface of a base material formed of various materials including a resin. That is, the composition of the present invention is used as a surface treatment composition.

According to the present invention, a composition comprising a perfluoropolyether containing compound having a carbon-carbon double bond obtained by reacting component (A) with component (B), that is, by reacting an isocyanate group (a —NCO group) present in component (A) with an active hydrogen containing group, for example a hydroxy group, present in (B1) a perfluoropolyether having an active hydrogen, (B2) a silane compound having an active hydrogen and (B3) a monomer having an active hydrogen and a carbon-carbon double bond.

As used herein, the "active hydrogen" represents a hydrogen atom which can be donated as a proton to an isocyanate group. The "active hydrogen containing group" represents a group containing the active hydrogen described above, and includes, for example, a —OH group, a —C(=O)H group, a —SH group, a —SO$_3$H group, a —SO$_2$H group, a —SOH group, a —NH$_2$ group, a —NH— group, a —SiH group, and the like.

Component (A) is a polyisocyanate which can be obtained by trimerizing a diisocyanate. The polyisocyanate which is a trimer of diisocyanate may exist as a polymer thereof.

In a preferable embodiment, the polyisocyanate which is a trimer of diisocyanate as component (A) may be an isocyanurate type polyisocyanate. The isocyanurate type polyisocyanate may exist as a polymer thereof. That is, the isocyanurate type polyisocyanate is a monocyclic compound having only one isocyanurate ring, or a polycyclic compound which is obtained by polymerization of the monocyclic compound, or a mixture thereof. The isocyanurate type polyisocyanate is commercially available, for example, as SUMIDUR (registered trademark) N3300 (manufactured by Sumitomo Bayer Urethane Co., Ltd.).

Examples of the diisocyanate which is used for preparing the above (A) polyisocyanate which is a trimer of diisocyanate include, but are not particularly limited to, a diisocyanate in which an isocyanate group is bonded to an aliphatic group, for example, hexamethylene diisocyanate, isophorone diisocyanate, xylylene diisocyanate, hydrogenated xylylene diisocyanate, dicyclohexylmethane diisocyanate; a diisocyanate in which an isocyanate group is bonded to an aromatic group, for example, tolylene diisocyanate, diphenylmethane diisocyanate, polymethylenepolyphenyl polyisocyanate, tolidine diisocyanate, and naphthalene diisocyanate.

Examples of the specific polyisocyanate which is a trimer of diisocyanate as component (A) include, but are not particularly limited to, a compound of the following formula:

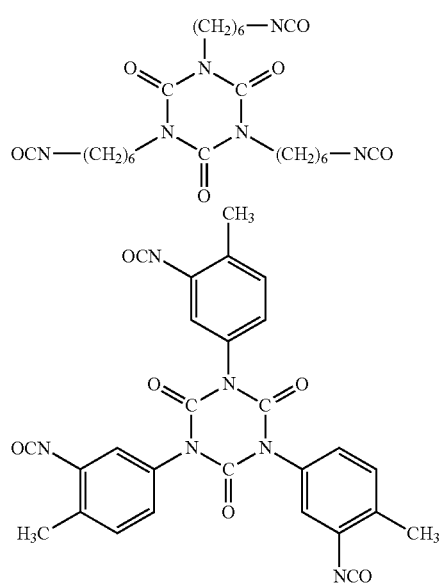

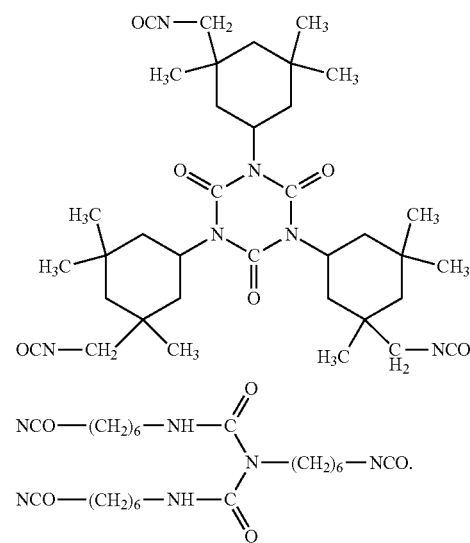

As mentioned above, these polyisocyanate may exist as a polymer, for example, when the polymer is an isocyanurate type polyisocyanate of hexamethylene diisocyanate, it may exist as a polymer of the following structure:

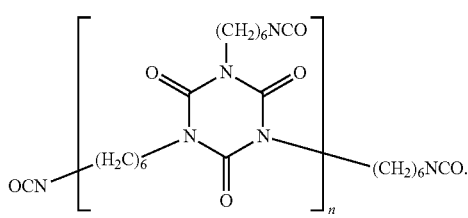

Component (B) comprises the following three components:

(B1) a perfluoropolyether having an active hydrogen,
(B2) a silane compound having an active hydrogen, and
(B3) a monomer having an active hydrogen and a carbon-carbon double bond.

The perfluoropolyether having an active hydrogen in component (B1) is a compound having one active hydrogen containing group, for example a hydroxy group, at one terminal of the molecular chain or having one active hydrogen containing group, for example, a hydroxy group, at each of two terminals of the molecular chain, in addition to the perfluoropolyether group.

The perfluoropolyether having an active hydrogen in component (B1) has a number average molecular weight of 500-12,000, preferably 1,000-10,000, more preferably 1,500-8,000, but not particularly limited thereto.

Preferably, component (B1) may be at least one compound of any one of the following general formulae (B1-i) and (B1-ii):

Rf—PFPE-$R^1$—$CH_2OH$   (B1-i)

$HOCH_2$—$R^1$—PFPE-$R^1$—$CH_2OH$   (B1-ii).

In the formulae (B1-i) and (B1-ii), Rf represents an alkyl group (for example, straight or branched) having 1-16 carbon atoms which may be substituted by one or more fluorine atoms, preferably a straight or branched alkyl group having 1-3 carbon atoms which may be substituted by one or more fluorine. Preferably, Rf is straight. Preferably, the alkyl group which may be substituted by one or more fluorine is a fluoroalkyl group in which a terminal carbon atom is $CF_2H$—, and the other carbon atoms are fully substituted by a fluorine atom or a perfluoroalkyl group, more preferably a perfluoroalkyl group, specifically —$CF_3$, —$CF_2CF_3$ or —$CF_2CF_2CF_3$.

In the formulae (B1-i) and (B1-ii), PFPE is a group of the following formula:

—$(OC_4F_8)_a$—$(OC_3F_6)_b$—$(OC_2F_4)_c$—$(OCF_2)_d$—.

In the formula, a, b, c and d represent the repeating number of each of four repeating units of perfluoropolyether, and are each independently an integer of an integer of 0-200, for example an integer of 1-200, and the sum of a, b, c and d is at least one, preferably 5-300, more preferably 10-200, further preferably 10-100. The occurrence order of the respective repeating units in parentheses with the subscript a, b, c or d is not limited in the formula. Among these repeating units, the —$(OC_4F_8)$— group may be —$(OCF_2CF_2CF_2CF_2)$—, —$(OCF(CF_3)CF_2CF_2)$—, —$(OCF_2CF(CF_3)CF_2)$—, —$(OCF_2CF_2CF(CF_3))$—, —$(OC(CF_3)_2CF_2)$—, —$(OCF_2C(CF_3)_2)$— and —$(OCF(CF_3)CF(CF_3))$—, preferably —$(OCF_2CF_2CF_2CF_2)$—. The —$(OC_3F_6)$— group may be —$(OCF_2CF_2CF_2)$—, —$(OCF(CF_3)CF_2)$— and —$(OCF_2CF(CF_3))$—, preferably —$(OCF_2CF_2CF_2)$—. The —$(OC_2F_4)$— group may be —$(OCF_2CF_2)$— and —$(OCF(CF_3))$—, preferably —$(OCF_2CF_2)$—.

The compound comprising the perfluoropolyether group can exert excellent water-repellency, oil-repellency and anti-fouling property (for example, preventing from adhering a fouling such as fingerprints).

In a preferable embodiment, the PFPE is a group of any one of the formulae (i)-(iii):

—$(OCF_2CF_2CF_2)_b$—   (i)

wherein b is an integer of 1-200,

—$(OCF(CF_3)CF_2)_b$—   (ii)

wherein b is an integer of 1-200, or

—$(OCF_2CF_2CF_2CF_2)_a$—$(OCF_2CF_2CF_2)_b$—$(OCF_2CF_2)_c$—$(OCF_2)_d$—   (iii)

wherein a and b are each independently 0 or an integer of 1-30, c and d are each independently an integer of 1-200, and the occurrence order of the respective repeating units in parentheses with the subscript a, b, c or d is not limited in the formula.

In the formulae (B1-i) and (B1-ii), $R^1$ is each independently a group of the following formula:

—$(Y)_f$—$(CF_2)_g$—$(CH_2)_h$—.

In this formula, Y is a divalent polar group. Examples of the divalent polar group include, but are not particularly limited to, —COO—, —OCO—, —CONH—, —$OCH_2CH(OH)CH_2$—, —$CH_2CH(OH)CH_2O$—, —COS—, —SCO—, and —O—, preferably it is —COO—, —CONH—, —$CH_2CH(OH)CH_2O$— or —O—. In this formula, f, g and h are each independently an integer of 0-50, preferably 0-20, for example an integer of 1-20, the sum of f, g and h is at least one, preferably 1-10. More preferably, f, g and h are an integer of 0-2, and further preferably, f is 0 or 1, g is 2, and h is 0 or 1. The occurrence order of the respective repeating units in parentheses with the subscript f, g or h is not limited in the formula.

In a preferable embodiment, component (B1) is a compound of the formula (B1-i).

Rf—PFPE-$R^1$—$CH_2OH$   (B1-i)

The silane compound having an active hydrogen in component (B2) is a compound having one active hydrogen containing group, for example a hydroxy group, at one terminal of the molecular chain or having one active hydrogen containing group, for example, a hydroxy group, at each of two terminals of the molecular chain.

The silane compound having an active hydrogen in component (B2) has a number average molecular weight of 100-20,000, preferably 500-15,000, more preferably 800-12,000, but not particularly limited thereto.

Preferably, component (B2) is at least one compound of the following general formula (B2-i):

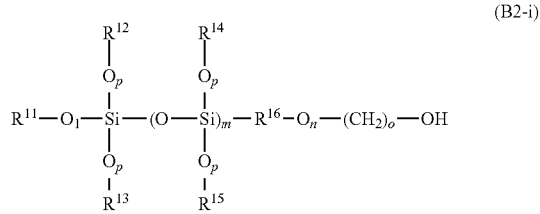

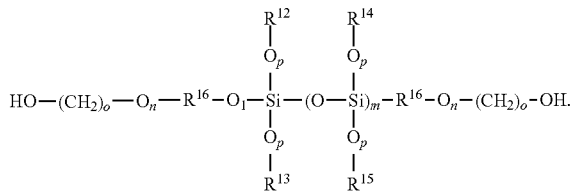

In the formulae (B2-i) and (B2-ii), $R^{11}$, $R^{12}$, $R^{13}$, $R^{14}$ and $R^{15}$ are each independently an alkyl group or an aryl group.

Examples of the alkyl group include, but are not particularly limited to, an alkyl group having 1-10 carbon atoms, and a cycloalkyl group having 3-20 carbon atoms, preferably an alkyl group having 1-6 carbon atoms. The alkyl group may be straight or branched, preferably straight. A preferable example is, for $R^{11}$, an n-butyl group, and for $R^{12}$-$R^{15}$, a methyl group.

Examples of the aryl group include, but are not particularly limited to, an aryl group having 6-20 carbon atoms. The aryl group may contain 2 or more rings. Preferable aryl group is a phenyl group.

The alkyl group and the aryl group may optionally contain a heteroatom, for example, a nitrogen atom, an oxygen atom or a sulfur atom in its molecular chain or ring.

Furthermore, the alkyl group and the aryl group may be optionally substituted by one or more substituents selected from a halogen; a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5-10 membered heterocyclyl group, a 5-10 membered unsaturated heterocyclyl group, a $C_{6-10}$ aryl group, a 5-10 membered heteroaryl, which may be substituted by one or more halogens.

In the formulae (B2-i) and (B2-ii), $R^{16}$ represents a divalent organic group. Preferably, $R^{16}$ is $-(CH_2)_r-$ wherein r is an integer of 1-20, preferably an integer of 1-10.

In the formulae (B2-i) and (B2-ii), l and n are each independently 0 or 1; m is an integer of 1-500, preferably an integer of 1-200, more preferably an integer of 5-150; o is an integer of 0-20, for example an integer of 1-20, and p is 0 or 1.

Examples of the specific compound of the formula (B2-i) include for example a compound of the formula:

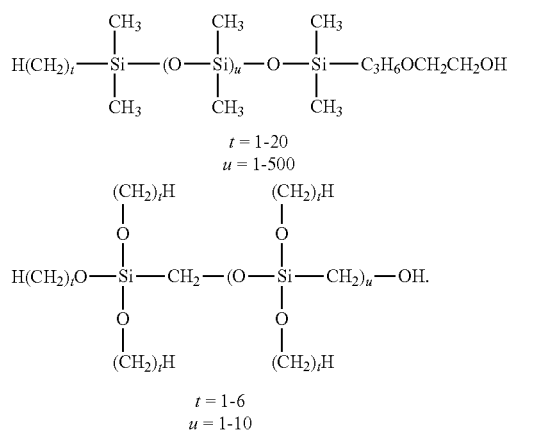

Component (B2) may be a silane compound having an amino group as an active hydrogen containing group.

Example of such compound includes, but is not particularly to, a compound of the following formula:

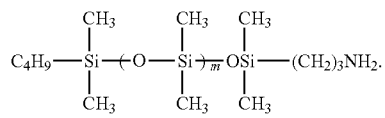

A ratio of an number average molecular weight of component (B1) to component (B2) is, but not particularly limited to, for example, 1:5-5:1, preferably 1:3-3:1, more preferably 1:3-3:2. By setting the ratio of the number average molecular weight of component (B1) to component (B2) within the above range, solubility in a fluorine-free solvent is more increased.

The monomer having an active hydrogen and a carbon-carbon double bond of component (B3) is preferably a (meth)acrylate ester monomer or a vinyl monomer having an active hydrogen containing group, in particular a hydroxy group. Examples of component (B3) include, but are not limited to, for example the following compounds:

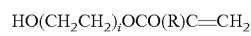

wherein R is a hydrogen atom, a chlorine atom, a fluorine atom, or an alkyl group having 1-10 carbon atoms which may be substituted by a fluorine atom, and i is 2-10, for example, 2-2-hydroxyethyl(meth)acrylate, 4-hydroxybutyl(meth)acrylate;

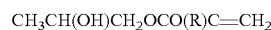

wherein R is a hydrogen atom, a chlorine atom, a fluorine atom, or n alkyl group having 1-10 carbon atoms which may be substituted by a fluorine atom, for example, 2-hydroxypropyl(meth)acrylate;

wherein R is a hydrogen atom, a chlorine atom, a fluorine atom, or an alkyl group having 1-10 carbon atoms which may be substituted by a fluorine atom, for example, 2-hydroxybutyl (meth)acrylate;

wherein R is a hydrogen atom, a chlorine atom, a fluorine atom, or an alkyl group having 1-10 carbon atoms which may be substituted by a fluorine atom, for example, 2-hydroxy-3-phenoxypropyl (meth)acrylate;

wherein R is a hydrogen atom, a chlorine atom, a fluorine atom, or an alkyl group having 1-10 carbon atoms which may be substituted by a fluorine atom, for example, pentaerythritol triacrylate;

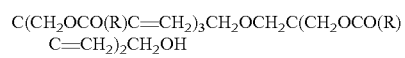

wherein R is a hydrogen atom, a chlorine atom, a fluorine atom, or an alkyl group having 1-10 carbon atoms which may be substituted by a fluorine atom, for example, dipentaerythritol polyacrylate;

wherein R is a hydrogen atom, a chlorine atom, a fluorine atom, or an alkyl group having 1-10 carbon atoms which may be substituted by a fluorine atom, for example, 2-acryloyloxyethyl-2-2-hydroxyethyl phthalate;

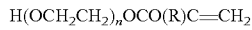

wherein n is 1-30, and R is a hydrogen atom, a chlorine atom, a fluorine atom, or an alkyl group having 1-10 carbon atoms which may be substituted by a fluorine atom, for example, poly(ethylene glycol) acrylate;

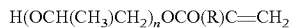

wherein n is 1-30, and R is a hydrogen atom, a chlorine atom, a fluorine atom, or an alkyl group having 1-10 carbon atoms which may be substituted by a fluorine atom, for example, poly(propylene glycol) acrylate;
an allylalcohol;

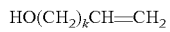

wherein k is 2-20;

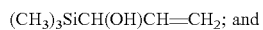

styrylphenol.

In a reaction of component (A) with component (B) in the present invention, the isocyanate group of component (A) and the hydroxy group of component (B) are reacted to form an urethane bond.

In the present invention, a total molar amount of component (B1), component (B2) and component (B3) to be reacted with component (A) is equal to a molar amount of the isocyanate group in component (A). Furthermore,
component (B1) 0.1-2 moles,
component (B2) 0.05-2 moles, and
component (B3) 5-8.95 moles
are reacted with 9 moles of the isocyanate group in component (A).

By setting the amount of components (B1)-(B3) within the above range, surface slip property, friction durability and solubility in a fluorine-free solvent are more increased.

Component (B1) is preferably 0.1-1.5 moles, more preferably 0.1-1 moles with respect to 9 moles of the isocyanate group in component (A).

Component (B2) is preferably 0.05-1.5 moles, more preferably 0.05-1 moles with respect to 9 moles of the isocyanate group in component (A).

More preferably,
component (B1) is 0.1-1 moles,
component (B2) is 0.05-1 moles, and
component (B3) is 7-8.85 moles,
with respect to 9 moles of the isocyanate group in component (A).

A method of the reaction of component (A) with components (B1)-(B3) is not particularly limited. For example, the reaction may be performed in one system (i.e., one-pot synthesis) or the respective reaction may be performed in each of two systems.

When the one-pot synthesis is performed, for example, by adding components (B1)-(B3) into component (A) simultaneously, they may be simultaneously reacted; or by sequentially adding components (B1)-(B3), they may be sequentially reacted. When they are sequentially added (reacted), the order of adding (reacting) is not particularly limited. For example, components (B1)-(B3) may be separately added and reacted in any order, or two components of components (B1)-(B3) may be simultaneously added and reacted, and then the other component may be added and reacted. Preferably, components (B1) and (B2) may be added and reacted, and then component (B3) may be added and reacted, or component (B1) may be added and reacted, and then component (B2) may be added and reacted, finally, component (B3) may be added and reacted. When they are sequentially added, the component added finally may be used in an excessive amount.

A solvent used in this reaction is not particularly limited as long as the reaction can proceed. Various fluorine solvents, various general-purpose solvent, or a mixture thereof at any ratio can be used, preferably, 1,1-dichloro-1,2,2,3,3-pentafluoropropane (HCFC 225) is used.

By performing the synthesis in the one-pot system, a process can be simplified, for example, purification in each step can be omitted.

When the reaction is performed in two systems, for example, in one system, component (A) and components (B1) and (B3) may be reacted to obtain the first composition. In the other system, component (A) and components (B2) and (B3) may be reacted to obtain the second composition. Then, the obtained first composition and the obtained second composition may be mixed to obtain the composition of the present invention. It is noted that in the composition of the present invention thus obtained, the compound containing a carbon-carbon double bond having both the perfluoropolyether derived from component (B1) and the silane part derived from component (B2) may be substantially absent. In addition, the order of the reaction in each system is not particularly limited. For example, component (A) and components (B1) (or component (B2)) and (B3) may be simultaneously reacted, or component (A) and component (B1) (or component (B2)) may be reacted, and then component (B3) may be reacted, or the reverse order is acceptable. It is preferable that component (A) and component (B1) (or component (B2)) are reacted, and then component (B3) is reacted.

As mentioned above, by performing the reaction of component (A) with component (B1) and the reaction of component (A) with component (B2) in a separate system from each other, for each reaction, a more suitable condition such as a solvent can be selected. If for each reaction, the suitable condition can be selected, variation in the products can be suppressed in comparison with the one-pot synthesis, in particular, in a large scale synthesis. In detail, generally, component (B1) is soluble in a fluorine solvent and is poor-soluble in a general-purpose solvent, while component (B2) is soluble in a general-purpose solvent and is poor-soluble in a fluorine solvent. When the synthesis is performed in the one-pot system, in particular, when the synthesis is performed in a large scale, influence due to the difference of the solubility become remarkable. Any one of component (B1) or component (B2) is not completely dissolved and it becomes difficult to stably control the reaction (in other words, to perform the reaction with high repeatability). On the other hand, when the reaction is performed in two systems, since the most suitable solvent can be selected for each reaction, it becomes easy to stably control the reaction. In other words, the reaction can be performed with high repeatability, thus, it becomes easy to suppress variation in the obtained products.

Examples of the solvent used in the reaction of component (A) with component (BR) include, but are not particularly limited to, a fluorine solvent (for example, HCFC 225, ZEORORA (registered trademark) H or the like), preferably, HCFC 225 or ZEORORA H, more preferably ZEORORA H.

Examples of the solvent used in the reaction of component (A) with component (B2) include, but are not particularly limited to as long as component (A) and component (B2) are successfully dissolved and the reaction proceeds, for example, dimethoxy ethane, methyl isobutyl ketone (MIBK), acetone, and the like. More preferably, methyl ethyl ketone is used.

It is noted that a solvent contained in the composition of the present invention obtained by mixing the first composition and the second composition thus obtained are not necessarily the solvent described above, and may be another solvent, for example, a fluorine-containing organic solvent or a fluorine-free organic solvent described below.

The obtained compound containing a carbon-carbon double bond may be a mixture of different type of compounds obtained by reacting an isocyanate group in the polyisocyanate molecule which is a trimer of diisocyanate in component (A) with any component selected from the group consisting of component (B2) and component (B3) in component (B1).

The composition of the present invention may further comprise at least one fluorine-containing oil of the following general formula (C).

$$Rf^1\text{—PFPE-}Rf^2 \qquad (C)$$

In the formula (C), $Rf^1$ represents an alkyl having 1-16 carbon atoms which may be substituted by one or more fluorine atoms, and $Rf^2$ represents a hydrogen atom, a fluorine atom, or an alkyl having 1-16 carbon atoms which may be substituted by one or more fluorine atoms. Preferably, the alkyl which may be substituted by one or more fluorine atoms is a fluoroalkyl group in which a terminal carbon atom is $CF_2H$—, and the other carbon atoms are fully substituted by a fluorine atom or a perfluoroalkyl group, more preferably a perfluoroalkyl group. More preferably, $Rf^1$ and $Rf^2$ are each independently a perfluoroalkyl group having 1-3 carbon atoms.

In the formula (C), PFPE is a group of the following general formula:

$$-(OC_4F_8)_{a'}-(OC_3F_6)_{b'}-(OC_2F_4)_{c'}-(OCF_2)_{d'}-$$

wherein a', b', c' and d' represent the repeating number of each of four repeating units of perfluoropolyether, and are each independently an integer of 0-300, preferably an integer of 0-200, for example an integer of 1-200, and the sum of a', b', c' and d' is at least 1, preferably 1-300. The occurrence order of the respective repeating units in parentheses with the subscript a', b', c' or d' is not limited in the formulae. Among these repeating units, the —(OC$_4$F$_8$)— group may be any of —(OCF$_2$CF$_2$CF$_2$CF$_2$)—, —(OCF(CF$_3$)CF$_2$CF$_2$)—, —(OCF$_2$CF(CF$_3$)CF$_2$)—, —(OCF$_2$CF$_2$CF(CF$_3$))—, —(OC(CF$_3$)$_2$CF$_2$)—, —(OCF$_2$C(CF$_3$)$_2$)—, —(OCF(CF$_3$)CF(CF$_3$))—, —(OCF(C$_2$F$_5$)CF$_2$)— and —(OC$_2$CF(C$_2$F$_5$))—, preferably —(OCF$_2$CF$_2$CF$_2$CF$_2$)—. The —(OC$_3$F$_6$)— group may be any of —(OCF$_2$CF$_2$CF$_2$)—, —(OCF(CF$_3$)CF$_2$)— and —(OCF$_2$CF(CF$_3$))—, preferably —(OCF$_2$CF$_2$CF$_2$)—. The —(OC$_2$F$_4$)— group may be any of —(OCF$_2$CF$_2$)— and —(OCF(CF$_3$))—, preferably —(OCF$_2$CF$_2$)—.

In a preferable embodiment, the fluorine-containing oil (C) is at least one compound of any one of the following formulae (C1)-(C3):

$$Rf^1\text{—}(OCF_2CF_2CF_2)_{b'}\text{—}Rf^2 \qquad (C1)$$

wherein $Rf^1$ and $Rf^2$ are as defined in the formula (C); and b' is an integer of 1-300, $$Rf^1\text{—}(OCF(CF_3)CF_2)_{b'}\text{—}Rf^2 \qquad (C2)$$

wherein $Rf^1$ and $Rf^2$ are as defined in the formula (C); and b' is an integer of 1-300, and or $$Rf^1\text{—}(OCF_2CF_2CF_2CF_2)_{a'}\text{—}(OCF_2CF_2CF_2)_{b'}\text{—}(OCF_2CF_2)_{c'}\text{—}(OCF_2)_{d'}\text{—}Rf^2 \qquad (C3)$$

wherein $Rf^1$ and $Rf^2$ are as defined in the formula (C);

a' and b' are each independently 0 or an integer of 1-30, c' and d' are each independently an integer of 1-300, and the occurrence order of the respective repeating units in parentheses with the subscript a', b', c' or d' is not limited in the formula.

The above-mentioned fluorine-containing oil (C) may have an average molecular weight of 1,000-30,000. By having such average molecular weight, high surface slip property can be obtained. Representatively, a compound of any one of the general formulae (C1)-(C3) has preferably an average molecular weight of about 1,500 or more. In such range of the average molecular weight, high surface slip property can be obtained.

The fluorine-containing oil (C) may be contained in the composition of the present invention, for example, at 0-80 parts by mass, preferably 0-40 parts by mass with respect to the total 100 parts by mass of the composition obtained by reacting component (A) with component (B).

The composition of the present invention may contain other components, for example, a silicone oil, an active energy curing initiator, and the like in addition to the above component.

Examples of the above-mentioned silicone oil include, for example, a liner or cyclic silicone oil having 2,000 or less siloxane bonds. The liner silicone oil may be so-called a straight silicone oil and a modified silicon oil. Examples of the straight silicone oil include dimethylsilicone oil, methylphenylsilicone oil, and methylhydrogensilicone oil. Examples of the modified silicone oil include that which is obtained by modifying a straight silicone oil with polyether, higher fatty acid ester, fluoroalkyl, amino, epoxy, carboxyl, alcohol, or the like. Examples of the cyclic silicone oil include, for example, cyclic dimethylsiloxane oil.

The silicone oil may be contained in the composition of the present invention, for example, at 0-50 parts by mass, preferably 0-10 parts by mass with respect to the total 100 parts by mass of the composition obtained by reacting component (A) with component (B).

As the active energy curing initiator, for example, a compound is used which generates a radical or cation only by irradiation of an electromagnetic wave of 350 nm or less, that is, an ultraviolet light, an electron beam, an X-ray, a γ-ray, etc., and functions as a catalyst initiating curing (cross-linking reaction) of a curable moiety (for example, carbon-carbon double bond) in the compound of the composition, usually a compound which generates a radical or cation, in particular a radical by irradiation of ultraviolet.

The active energy curing initiator in the composition of the present invention can be appropriately selected depending on a type of the component (B3) having a carbon-carbon double bond, a type or irradiation intensity of an active energy ray used (range of wavelength, etc.). When the general active energy curing initiator is used, examples of the initiator include, for example, the following compounds.

Acetophenones acetophenone, chloroacetophenone, diethoxyacetophenone, hydroxyacetophenone, α-aminoacetophenone, hydroxypropiophenone, 2-methyl-1-[4-(methylthio)phenyl]-2-morpholinopropan-1-one, and the like.

Benzoins benzoin, benzoin methyl ether, benzoin ethyl ether, benzoin isopropyl ether, benzoin isobutyl ether, benzyl dimethyl ketal, and the like.

Benzophenones benzophenone, benzoyl benzoate, methyl benzoyl benzoate, 4-phenyl benzophenone, hydroxy benzophenone, hydroxy-propyl benzophenone, acrylated benzophenone, Michler's ketone, and the like.

Thioxanthones thioxanthone, chlorothioxanthone, methylthioxanthone, diethylthioxanthone, dimethylthioxanthone, and the like.

Others benzyl, α-acyloxime ester, acylphosphine oxide, glyoxy ester, 3-ketocoumarin, 2-ethylanthraquinone, camphorquinone, anthraquinone, and the like.

These active energy curing initiators may be used alone or may be used in combination of two or more.

The active energy curing initiator is contained at 0.01-30 parts by mass, preferably 0.1-20 parts by mass with respect to the total 100 parts by mass of the compound obtained by reacting component (A) with component (B), and if present, the fluorine-containing oil (C), but are not particularly limited thereto.

The composition of the present invention may contain a solvent. The composition of the present invention has high solubility in not only a fluorine-containing organic solvent, but also a fluorine-free organic solvent which is a general-purpose solvent. Therefore, as the above solvent, the fluorine-containing organic solvent and the fluorine-free organic solvent can be used.

Examples of the fluorine-containing organic solvent include, for example, perfluorohexane, perfluorooctane, perfluoro-dimethyl cyclohexane, perfluorodecalin, perfluoroalkyl ethanol, perfluorobenzene, perfluorotoluene, perfluoroalkylamines (Fluorinert (trade name), etc.), perfluoroalkyl ethers, perfluorobutyl tetrahydrofuran, polyfluoro-aliphatic hydrocarbons (ASAHIKLIN AC6000 (trade name)), hydrochlorofluorocarbons (ASAHIKLIN AK-225 (trade name), etc.), hydrofluoroethers (Novec (trade name), HFE-7100 (trade name), etc.), 1,1,2,2,3,3,4-heptafluorocyclopentane ((ZEORORA H (trade name), etc.), fluorine-containing alcohols, perfluoroalkyl bromide, perfluoroalkyl iodide, perfluorcpolyether (Krytox (trade name), Demnum (trade name), Fomblin (trade name), etc.), 1,3-bistrifluoromethyl benzene, 2-(perfluoroalkyl)ethyl methacrylate, 2-(perfluoroalkyl) ethyl acrylate, perfluoroalkyl ethylene, Freon 134a, and hexafluoropropene oligomers.

Examples of the fluorine-free organic solvent include, for example, acetone, methyl ethyl ketone, methyl isobutyl ketone, cyclohexanone, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether pentane, hexane, heptane, octane, dichloromethane, chloroform, carbon tetrachloride, dichloroethane, carbon disulfide, benzene, toluene, xylene, nitrobenzene, diethyl ether, dimethoxyethane, diglyme, triglyme, ethyl acetate, butyl acetate, dimethylformamide, dimethyl sulfoxide, acetonitrile, benzonitrile, butanol, 1-propanol, 2-propanol, ethanol, methanol, and diacetone alcohol.

These solvents may be used alone or may be used in combination of two or more.

In a preferable embodiment, the solvent may be the fluorine-free organic solvent. The solvent is preferably acetone, methyl ethyl ketone, methyl isobutyl ketone, ethyl acetate, butyl acetate, or the like, more preferably acetone, methyl ethyl ketone, methyl isobutyl ketone, or the like.

In another preferable embodiment, the solvent may be a mixed solvent of a fluorine-containing organic solvent and a fluorine-free organic solvent.

In particular, the solvent used in the composition of the present invention is preferably methyl isobutyl ketone, propylene glycol monomethyl ether, acetone, methyl ethyl ketone, cyclohexanone, ethyl acetate, butyl acetate, or diacetone alcohol. When the compound containing a carbon-carbon double bond contained in the composition of the present invention is a mixture of a compound obtained by a reaction of component (A) with component (B1) and a compound obtained by a reaction of component (A) with component (B2), the solvent to be used is preferably the mixed solvent of the fluorine-containing organic solvent and the fluorine-free organic solvent, for example, a mixed solvent of one or more solvents selected from hydrochlorofluorocarbons (ASAHIKLIN AK-225 (trade name), etc.) and 1,1,2,2,3,3,4-heptafluorocyclopentane and one or more solvents selected from methyl isobutyl ketone, propylene glycol monomethyl ether, acetone, methyl ethyl ketone, cyclohexanone, ethyl acetate, butyl acetate and diacetone alcohol, more preferably a mixed solvent of 1,1,2,2,3,3,4-heptafluorocyclopentane, propylene glycol monomethyl ether and methyl ethyl ketone.

The solvent is contained at 5-10,000 parts by mass, preferably 5-5,000 parts by mass with respect to the total 100 parts by mass of the compound obtained by reacting component (A) with component (B), and if present, the fluorine-containing oil (C), but are not particularly limited thereto.

In one embodiment, the composition of the present invention can be added to a matrix forming composition to provide a curable composition.

The curable composition contains the composition of the present invention at 0.01-20% by mass, preferably 0.01-10% by mass, more preferably, 0.1-10% by mass with respect to the total of the matrix forming composition and the composition of the present invention.

The curable composition of the present invention may contain a solvent. As the solvent, the fluorine-containing organic solvent, the fluorine-free organic solvent or the mixed solvent thereof described above for the composition of the present invention can be used.

These solvents may be used alone or may be used in combination of two or more.

In a preferable embodiment, the solvent is a fluorine containing organic solvent.

In another preferable embodiment, the solvent may be a mixed solvent of the fluorine-containing organic solvent and the fluorine-free organic solvent.

The solvent is contained at 0-19,900 parts by mass, preferably 0-10,000 parts by mass with respect to the total 100 parts by mass of the compound obtained by reacting component (A) with component (B), and if present, the fluorine-containing oil (C) and the matrix forming composition, but are not particularly limited thereto.

The curable composition of the present invention may contain other components, for example, a silicone oil, an active energy curing initiator, and the like in addition to the above component.

As the silicone oil and the active energy curing initiator, the silicone oil and the active energy curing initiator described for the composition of the present invention can be used.

The matrix forming composition means a composition containing a compound having at least one carbon-carbon double bond which is, but not particularly limited to, for example, a monofunctional and/or polyfunctional acrylate and methacrylate (hereinafter, acrylate and methacrylate also generally referred to as "(meth)acrylate"), a monofunctional and/or polyfunctional urethane (meth)acrylate, a monofunctional and/or polyfunctional epoxy (meth)acrylate. Examples of the matrix forming composition include, but are not particularly limited to, a composition which is generally a hard coating agent or an antireflection agent, for example, a hard coating agent containing the polyfunctional (meth)acrylate or an antireflection agent containing a fluorine-containing (meth)acrylate. The hard coating agent is commercially available, for example, as Beam set 502H, 504H, 505A-6, 550B, 575CB, 577, 1402 (trade name) from Arakawa Chemical Industry Co., Ltd.; as EBECRYL40 (trade name) from Daicel Cytec company; and as HR300 series (trade name) from Yokohama Rubber Co., Ltd. The antireflection agent is commercially available, for example, as Optool AR-110 (trade name) from Daikin Industries, Ltd.

The composition and the curable composition of the present invention may further comprise an antioxidant, a thickener, a leveling agent, an antifoaming agent, an antistatic agent, an antifogging agent, an ultraviolet absorber, a pigment, a dye, an inorganic fine particle such as a silica and a hollow silica, an aluminum paste, a talc, a glass frit, a filler such as a metal powder, butylated hydroxy toluene (BHT) and a polymerization inhibitor such as phenothiazine (PTZ).

Next, the article of the present invention will be described.

The article of the present invention comprises a base material and a layer (i.e., surface treating layer) which is formed from the composition or the curable composition of the present invention (hereinafter, the composition or the curable composition of the present invention are generally referred to as a "surface treating agent") on the surface of the base material. This article can be produced, for example, as follows.

Firstly, the base material is provided. The base material usable in the present invention may be composed of any suitable material such as a glass, a resin (may be a natural or synthetic resin such as a common plastic material, preferably, a polycarbonate resin, a poly(meth)acrylate resin, a polyethylene terephthalate resin, a triacetyl cellulose resin, and may be in form of a plate, a film, or others), a metal (may be a simple substance of a metal such as aluminum, copper, or iron, or a complex such as alloy or the like), a ceramic, a semiconductor (silicon, germanium, or the like), a fiber (a fabric, a non-woven fabric, or the like), a fur, a leather, a wood, a pottery, a stone, an architectural member, a medical apparatus, a medical material or the like.

For example, when an article to be produced is an optical member, a material constituting the surface of the base material may be a material for an optical member, for example, a glass or a transparent plastic. Furthermore, the base material may have an insulating layer, an adhesive layer, a protecting layer, a decorated frame layer (I-CON), an atomizing layer, a hard coating layer, a polarizing film, a phase difference film, a liquid crystal display module, and the like, depending on its specific specification.

The shape of the base material is not specifically limited. The region of the surface of the base material on which the surface treating layer should be formed may be at least a part of the surface of the base material, and may be appropriately determined depending on use, the specific specification, and the like of the article to be produced.

Next, the film of the above surface treating agent of the present invention is formed on the surface of the base material, and the film is post-treated, as necessary, and thereby the surface treating layer is formed from the surface treating agent.

The formation of the film of the surface treating agent of the present invention can be performed by applying the above surface treating agent on the surface of the base material such that the surface treating agent coats the surface. The method of coating is not specifically limited. For example, a wet coating method or a dry coating method can be used.

Examples of the wet coating method include dip coating, spin coating, flow coating, spray coating, roll coating, gravure coating, micro-gravure coating, bar coating, die coating, screen printing and a similar method.

When the wet coating method is used, the surface treating agent of the present invention is diluted with a solvent, and then it is applied to the surface of the base material. As the solvent, the above-mentioned fluorine-containing organic solvent and fluorine-free organic solvent can be used. In view of stability of the surface treating agent of the present invention and volatile property of the solvent, the following solvents are preferably used: an aliphatic perfluorohydrocarbon having 5-12 carbon atoms (for example, perfluorohexane, perfluoromethylcyclohexane and perfluoro-1,3-dimethylcyclohexane); an aromatic polyfluorohydrocarbon (for example, bis(trifluoromethyl)benzene); an aliphatic polyfluorohydrocarbon; a hydrofluoroether (HFE) (for example, an alkyl perfluoroalkyl ether such as perfluoropropyl methyl ether ($C_3F_7OCH_3$), perfluorobutyl methyl ether ($C_4F_9OCH_3$), perfluorobutyl ethyl ether ($C_4F_9OC_2H_5$), and perfluorohexyl methyl ether ($C_2F_5CF(OCH_3)C_3F_7$) (the perfluoroalkyl group and the alkyl group may be liner or branched)), a hydrochlorofluorocarbon (ASAHIKLIN AK-225 (trade name)); a cellosolve solvent such as methyl cellosolve, ethyl cellosolve, methyl cellosolve acetate, ethyl cellosolve acetate; an ester solvent such as diethyl oxalate, ethyl pyruvate, ethyl-2-hydroxy butyrate, ethyl acetoacetate, ethyl acetate, butyl acetate, amyl acetate, ethyl butyrate, butyl butyrate, methyl lactate, ethyl lactate, methyl 3-methoxypropionate, ethyl 3-methoxypropionate, methyl 2-hydroxyisobutyrate, ethyl 2-hydroxyisobutyrate; a propylene glycol solvent such as propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether; a ketone solvent such as acetone, methyl ethyl ketone, methyl isobutyl ketone, 2-hexanone, cyclohexanone, methyl amino ketone, 2-heptanone; an alcohol solvent such as methanol, ethanol, propanol, isopropanol, butanol, diacetone alcohol; an aromatic hydrocarbon such as toluene, xylene, and the like. These solvents may be used alone or as a mixture of 2 or more compound. Among them, hydrofluoroether, the glycol solvent, the ester solvent, the ketone solvent and the alcohol solvent are preferable, and perfluorobutyl methyl ether ($C_4F_9OCH_3$) and/or perfluorobutyl ethyl ether ($C_4F_9OC_2H_5$), propylene glycol monomethyl ether, ethyl acetate, butyl acetate, propylene glycol monomethyl ether acetate, methyl isobutyl ketone, isopropanol, butanol and diacetone alcohol are particularly preferable.

Next, the film is post-treated. This post-treatment is performed by irradiation of, for example, an active energy ray, for example, an electromagnetic wave of 350 nm or less, that is, an ultraviolet light, an electron beam, an X-ray, a Y-ray, etc., but are not limited thereto. By performing such post-treatment, curing of a curable moiety in the composition of the present invention (for example, the carbon-carbon double bond), and if present a curable moiety of the hard coating agent is initiated, so that a bond between these compounds or between these compounds and the base material is formed. Such post-treatment contributes to increasing of friction durability of the obtained surface treating layer.

As described above, the surface treating layer derived from the surface treating agent of the present invention is formed on the surface of the base material to produce the article of the present invention. The surface treating layer thus formed has high surface slip property (or lubricity, for example, wiping property of a fouling such as fingerprints and excellent tactile feeling in a finger) and high friction durability in addition to water-repellency, oil-repellency, and antifouling property.

Furthermore, the present invention further provides an optical material having the surface treating layer on the outermost layer.

Examples of the optical material include preferably a variety of optical materials in addition to the optical material for displays, or the like exemplified in below: for example, lens of glasses, or the like; displays such as a cathode ray tube (CRT; for example, TV, personal computer monitor), a liquid crystal display, a plasma display, an organic EL display, an inorganic thin-film EL dot matrix display, a rear projection display, a vacuum fluorescent display (VFD), a field emission display (FED; Field Emission Display), or a front surface protective plate, an antiscattering film, an antireflection plate, a polarizing plate, or an anti-glare plate of such displays, or that which have been subjected to antireflection treatment on their surface; a touch panel sheet of an instrument such as a mobile phone or a personal digital assistance; a disk surface of an optical disk such as a Blu-ray disk, a DVD disk, a CD-R or MO; an optical fiber, and the like.

The thickness of the surface treating layer is not specifically limited. For the optical member, the thickness of the surface treating layer is within the range of 0.1-30 μm, preferably 0.5-20 μm, in view of optical performance, friction durability and antifouling property.

Hereinbefore, the article produced by using the surface treating agent of the present invention is described in detail. It is noted that an application or a method for using the surface treating agent of the present invention, or a method for producing the article are not limited to the above exemplification.

EXAMPLE

Example 1

In 1 L of a four-necked flask equipped with a dropping funnel, a condenser, a thermometer and a stirrer, SUMIDUR (registered trademark) N3300 (manufactured by Sumitomo Bayer Urethane Co., Ltd., the content of the NCO group: 21.8%, 36.6 g) was dissolved in HCFC 225 (219.4 g), and dibutyltin dilaurate (manufactured by Wako Pure Chemical Industries, Ltd., 0.30 g) was added. A solution in which an alcohol having a perfluoropolyether of an average composition: $CF_3CF_2CF_2O(CF_2CF_2CF_2O)_{14}CF_2CF_2CH_2OH$ (hereinafter, referred to as a "PFPE alcohol", 30.0 g) was dissolved in HCFC 225 (30.0 g) was dropped into the mixture under nitrogen flowing with stirring at 40° C. for 1 hour, and the mixture was stirred for 1 hour. A solution in which SILAPLANE (registered trademark) FM-0411 (manufactured by JNC Corporation, the molecular weight:

1,000, 10.5 g) was dissolved in HCFC 225 (10.5 g) was dropped into the mixture for 1 hour, and the mixture was stirred for 1 hour. Light ester (trade name) HOA (manufactured by Kyoeisha Chemical Co., Ltd., 19.6 g) was dropped for 30 minutes, and the mixture was stirred for 4 hours. It was confirmed that absorption of NCO in IR (Infrared Spectroscopy) was completely disappeared. Dibutyl hydroxy toluene (0.05 g) was added, and HCFC 225 was completely removed by an evaporator.

component (B1)=2,658 component (B2)=1,000 component (B1)/component (B2)/component (B3)=0.5/0.5/8

Examples 2-11

The compositions of Examples 2-11 were prepared similarly to Example 1 except that the use amount of agents was changed as shown in the following table.

Example 2

TABLE 1

| SUMIDUR N3300 | 30.5 g |
|---|---|
| HCFC225 (for dissolving SUMIDUR) | 182.8 g |
| dibutyltin dilaurate | 0.03 g |
| PFPE alcohol | 50.0 g |
| HCFC225 (for dissolving PFPE alcohol) | 50.0 g |
| SILAPLANE FM-0411 | 8.8 g |
| HCFC225 (for dissolving SILAPLANE) | 8.8 g |
| Light ester HOA | 15.3 g |
| dibutyl hydroxy toluene | 0.05 g |

Example 3

TABLE 2

| SUMIDUR N3300 | 30.5 g |
|---|---|
| HCFC225 (for dissolving SUMIDUR) | 182.8 g |
| dibutyltin dilaurate | 0.03 g |
| PFPE alcohol | 50.0 g |
| HCFC225 (for dissolving PFPE alcohol) | 50.0 g |
| SILAPLANE FM-0411 | 17.6 g |
| HCFC225 (for dissolving SILAPLANE) | 17.6 g |
| Light ester HOA | 14.3 g |
| dibutyl hydroxy toluene | 0.05 g |

Example 4

TABLE 3

| SUMIDUR N3300 | 36.6 g |
|---|---|
| HCFC225 (for dissolving SUMIDUR) | 219.4 g |
| dibutyltin dilaurate | 0.03 g |
| PFPE alcohol | 30.0 g |
| HCFC225 (for dissolving PFPE alcohol) | 30.0 g |
| X-22-170BX in place of SILAPLANE | 29.5 g |
| HCFC225 (for dissolving X-22-170BX) | 29.5 g |
| Light ester HOA | 19.6 g |
| dibutyl hydroxy toluene | 0.05 g |

*X-22-170BX (product name); manufactured by Shin-Etsu Chemical Co., Ltd. (molecular weight: 2,800)

Example 5

TABLE 4

| | |
|---|---|
| SUMIDUR N3300 | 30.5 g |
| HCFC225 (for dissolving SUMIDUR) | 182.8 g |
| dibutyltin dilaurate | 0.03 g |
| PFPE alcohol | 50.0 g |
| HCFC225 (for dissolving PFPE alcohol) | 50.0 g |
| X-22-170BX in place of SILAPLANE | 24.6 g |
| HCFC225 (for dissolving X-22-170BX) | 24.6 g |
| Light ester HOA | 15.3 g |
| dibutyl hydroxy toluene | 0.05 g |

Example 6

TABLE 5

| | |
|---|---|
| SUMIDUR N3300 | 24.4 g |
| HCFC225 (for dissolving SUMIDUR) | 146.3 g |
| dibutyltin dilaurate | 0.03 g |
| PFPE alcohol | 40.0 g |
| HCFC225 (for dissolving PFPE alcohol) | 40.0 g |
| X-22-170BX in place of SILAPLANE | 39.4 g |
| HCFC225 (for dissolving X-22-170BX) | 39.4 g |
| Light ester HOA | 11.4 g |
| dibutyl hydroxy toluene | 0.05 g |

Example 7

TABLE 6

| | |
|---|---|
| SUMIDUR N3300 | 42.7 g |
| HCFC225 (for dissolving SUMIDUR) | 256.0 g |
| dibutyltin dilaurate | 0.03 g |
| PFPE alcohol | 35.0 g |
| HCFC225 (for dissolving PFPE alcohol) | 35.0 g |
| SILAPLANE FM-0421 | 12.3 g |
| HCFC225 (for dissolving SILAPLANE) | 12.3 g |
| Light ester HOA | 24.0 g |
| dibutyl hydroxy toluene | 0.05 g |

*SILAPLANE (registered trademark) FM-0421; manufactured by JNC Corporation (Molecular weight: 5,000)

Example 8

TABLE 7

| | |
|---|---|
| SUMIDUR N3300 | 30.2 g |
| HCFC225 (for dissolving SUMIDUR) | 181.2 g |
| dibutyltin dilaurate | 0.03 g |
| PFPE alcohol | 40.0 g |
| HCFC225 (for dissolving PFPE alcohol) | 40.0 g |
| X-22-170BX in place of SILAPLANE | 24.4 g |
| HCFC225 (for dissolving X-22-170BX) | 24.4 g |
| Light ester HOA | 16.2 g |
| dibutyl hydroxy toluene | 0.05 g |

Example 9

TABLE 8

| | |
|---|---|
| SUMIDUR N3300 | 42.7 g |
| HCFC225 (for dissolving SUMIDUR) | 256.0 g |
| dibutyltin dilaurate | 0.03 g |
| PFPE alcohol | 35.0 g |
| HCFC225 (for dissolving PFPE alcohol) | 35.0 g |
| SILAPLANE FM-0425 | 12.3 g |
| HCFC225 (for dissolving SILAPLANE) | 12.3 g |
| Light ester HOA | 24.1 g |
| dibutyl hydroxy toluene | 0.05 g |

*SILAPLANE (registered trademark) FM-0425; manufactured by JNC Corporation (Molecular weight: 10,000)

Example 10

TABLE 9

| | |
|---|---|
| SUMIDUR N3300 | 22.2 g |
| HCFC225 (for dissolving SUMIDUR) | 230.0 g |
| dibutyltin dilaurate | 0.03 g |
| PFPE alcohol | 15.0 g |
| HCFC225 (for dissolving PFPE alcohol) | 15.0 g |
| X-22-170BX in place of SILAPLANE FM-0411 | 17.9 g |
| HCFC225 (for dissolving X-22-170BX) | 17.9 g |
| A-TMM-3LM-N (trade name) (manufactured by Shin-Nakamura Chemical Co., Ltd.) in place of Light ester HOA | 61.3 g |
| dibutyl hydroxy toluene | 0.05 g |

Example 11

TABLE 10

| | |
|---|---|
| SUMIDUR N3300 | 14.8 g |
| HCFC225 (for dissolving SUMIDUR) | 170.0 g |
| dibutyltin dilaurate | 0.03 g |
| PFPE alcohol | 10.0 g |
| HCFC225 (for dissolving PFPE alcohol) | 10.0 g |
| X-22-170BX in place of SILAPLANE FM-0411 | 12.0 g |
| HCFC225 (for dissolving X-22-170BX) | 12.0 g |
| A-9570W (trade name) (manufactured by Shin-Nakamura Chemical Co., Ltd.) in place of Light ester HOA | 48.7 g |
| dibutyl hydroxy toluene | 0.05 g |

Example 12

Preparation of the First Composition

In 5 L of a four-necked flask equipped with a dropping funnel, a condenser, a thermometer and a stirrer, SUMIDUR (registered trademark) N3300 (manufactured by Sumitomo Bayer Urethane Co., Ltd., the content of the NCO group: 21.8%, 304.5 g) was dissolved in ZEORORA H (manufactured by Nippon ZEON Corporation, 1760 g), and dibutyltin dilaurate (manufactured by Wako Pure Chemical Industries, Ltd., 0.3 g) was added. A solution in which an alcohol having a perfluoropolyether of an average composition: $CF_3CF_2CF_2O(CF_2CF_2CF_2O)_{14}CF_2CF_2CH_2CH$ (PFPE alcohol, 500 g) was dissolved in ZEORORA H (500 g) was dropped into the mixture under nitrogen flowing with stirring at 40° C. for 1 hour, and the mixture was stirred for 1 hour. Light ester HOA (196 g) was dropped for 30 minutes, and the mixture was stirred for 4 hours. After confirming that absorption of NCO in IR (Infrared Spectroscopy) was completely disappeared, dibutyl hydroxy toluene (0.5 g) was added, and the mixture was stirred for 15 minutes. The mixture was diluted with propylene glycol monomethylether (PGME) such that the concentration of the polymer solid in the solution was 20% to provide 20 wt % of the perfluoropolyether urethane acrylate compound solution in ZECRORA H/PGME.

Preparation of the Second Composition

In 1 L of a four-necked flask equipped with a dropping funnel, a condenser, a thermometer and a stirrer, SUMIDUR (registered trademark) N3300 (manufactured by Sumitomo Bayer Urethane Co., Ltd., the content of the NCO group: 21.8%, 52.6 g) was dissolved in methyl ethyl ketone (295 g), and dibutyltin dilaurate (manufactured by Wako Pure Chemical Industries, Ltd., 0.053 g) was added. A solution in which SILAPLANE (registered trademark) FM-0411 (manufactured by JNC Corporation, the molecular weight: 1,000, 100 g) was dissolved in methyl ethyl ketone (100 g) was dropped into the mixture under nitrogen flowing with stirring at 40° C. for 1 hour, and the mixture was stirred for 1 hour. Light ester HOA (manufactured by Kyoeisha Chemical Co., Ltd., 25.3 g) was dropped for 30 minutes, and the mixture was stirred for 4 hours. It was confirmed that absorption of NCO in IR (Infrared Spectroscopy) was completely disappeared. Dibutyl hydroxy toluene (0.16 g) was added and the mixture was stirred for 15 minutes, and diluted with methyl ethyl ketone such that the concentration of the solid in the solution was 20% by mass to provide 20% of the desired compound solution in methyl ethyl ketone.

Preparation of the Composition of the Present Invention

To 5 L of a four-necked flask equipped with a dropping funnel, a thermometer and a stirrer, the first composition obtained above (2004 g) and methyl ethyl ketone (998 g) were added and stirred for 30 minutes. The second composition obtained above (715 g) was dropped by using a dropping funnel and mixed to provide the composition of the present invention.

Example 13

With respect to the first composition, the similar process to that of Example 12 described above was performed.

With respect to the second composition, the similar process to that of Example 12 described above was performed except the use amount of the agents were changed as shown in the following table.

TABLE 11

| | |
|---|---|
| SUMIDUR N3300 | 17.3 g |
| methyl ethyl ketone (for dissolving SUMIDUR) | 240 g |
| dibutyltin dilaurate | 0.05 g |
| SILAPLANEFM-0421 in place of SILAPLANE FM-0411 | 150 g |
| methyl ethyl ketone (for dissolving SILAPLANE) | 150 g |
| Light ester HOA | 8.4 g |
| dibutyl hydroxy toluene | 0.15 g |

Preparation of the Composition of the Present Invention

To 5 L of a four-necked flask equipped with a dropping funnel, a thermometer and a stirrer, the first composition obtained above (2427 g) and methyl ethyl ketone (976 g) were added and stirred for 30 minutes. The second composition obtained above (500 g) was dropped by using a dropping funnel and mixed to provide the composition of the present invention.

Example 14

With respect to the first composition, the similar process to that of Example 12 described above was performed.

With respect to the second composition, the similar process to that of Example 12 described above was performed except the use amount of the agents were changed as shown in the following table.

TABLE 12

| | |
|---|---|
| SUMIDUR N3300 | 20.6 g |
| methyl ethyl ketone (for dissolving SUMIDUR) | 262 g |
| dibutyltin dilaurate | 0.05 g |
| X-22-170BX in place of SILAPLANE FM-0411 | 100 g |
| methyl ethyl ketone (for dissolving X-22-170BX) | 100 g |
| A-TMM-3LM-N (trade name) (manufactured by Shin-Nakamura Chemical Co. Ltd.) | 42 g |
| dibutyl hydroxy toluene | 0.08 g |

Preparation of the Composition of the Present Invention

To 5 L of a four-necked flask equipped with a dropping funnel, a thermometer and a stirrer, the first composition obtained above (1098 g) and methyl ethyl ketone (532 g) were added and stirred for 30 minutes. The second composition obtained above (500 g) was dropped by using a dropping funnel and mixed to provide the composition of the present invention.

Example 15

With respect to the first composition, the similar process to that of Example 12 described above was performed.

With respect to the second composition, the similar process to that of Example 12 described above was performed except the use amount of the agents were changed as shown in the following table.

TABLE 13

| | |
|---|---|
| SUMIDUR N3300 | 20.6 g |
| methyl ethyl ketone (for dissolving SUMIDUR) | 281 g |
| dibutyltin dilaurate | 0.05 g |
| X-22-170BX in place of SILAPLANE FM-0411 | 100 g |
| methyl ethyl ketone (for dissolving X-22-170BX) | 100 g |
| A-9570W (trade name) (manufactured by Shin-Nakamura Chemical Co., Ltd.) | 51 g |
| dibutyl hydroxy toluene | 0.1 g |

Preparation of the Composition of the Present Invention

To 5 L of a four-necked flask equipped with a dropping funnel, a thermometer and a stirrer, the first composition obtained above (1048 g) and methyl ethyl ketone (516 g) were added and stirred for 30 minutes. The second composition obtained above (500 g) was dropped by using a dropping funnel and mixed to provide the composition of the present invention.

The number average molecular weight of component (B1) and (B2) and a ratio (a molar ratio) of component (B1), component (B2) and component (B3) with respect to 9 moles of the isocyanate group in component (A) in Examples 1-15 are shown in the following table.

TABLE 14

| | Number average molecular weight | | |
|---|---|---|---|
| | Component (B1) | Component (B2) | B1/B2/B3 (molar ratio) |
| Example 1 | 2,658 | 1,000 | 0.5/0.5/8 |
| Example 2 | 2,658 | 1,000 | 1/0.5/7.5 |

TABLE 14-continued

|  | Number average molecular weight | | B1/B2/B3 (molar ratio) |
|---|---|---|---|
|  | Component (B1) | Component (B2) |  |
| Example 3 | 2,658 | 1,000 | 1/1/7 |
| Example 4 | 2,658 | 2,800 | 0.5/0.5/8 |
| Example 5 | 2,658 | 2,800 | 1/0.5/7.5 |
| Example 6 | 2,658 | 2,800 | 1/1/7 |
| Example 7 | 2,658 | 5,000 | 0.5/0.1/8.4 |
| Example 8 | 4,290 | 2,800 | 0.5/0.5/8 |
| Example 9 | 2,658 | 10,000 | 0.5/0.05/8.45 |
| Example 10 | 2,658 | 2,800 | 0.5/0.5/8 |
| Example 11 | 2,658 | 2,800 | 0.5/0.5/8 |
| Example 12 | 2,658 | 1,000 | 0.75/0.75/7.5 |
| Example 13 | 2,658 | 5,000 | 0.94/0.18/7.88 |
| Example 14 | 2,658 | 2,800 | 0.85/0.45/7.7 |
| Example 15 | 2,658 | 2,800 | 0.85/0.45/7.7 |

Comparative Example 1

In 1 L of a four-necked flask equipped with a dropping funnel, a condenser, a thermometer and a stirrer, SUMIDUR (registered trademark) N3300 (manufactured by Sumitomo Bayer Urethane Co., Ltd., the content of the NCO group: 21.8%, 36.6 g) was dissolved in HCFC 225 (219.4 g), and dibutyltin dilaurate (manufactured by Wako Pure Chemical Industries, Ltd., 0.30 g) was added. A solution in which an alcohol having a perfluoropolyether of an average composition: $CF_3CF_2CF_2O(CF_2CF_2CF_2O)_{14}CF_2CF_2CH_2OH$ (PFPE alcohol, 60.0 g) was dissolved in HCFC 225 (60.0 g) was dropped into the mixture under nitrogen flowing with stirring at 40° C. for 1 hour, and the mixture was stirred for 1 hour. Light ester (trade name) HOA (manufactured by Kyoeisha Chemical Co., Ltd., 19.6 g) was dropped for 30 minutes, and the mixture was stirred for 4 hours. It was confirmed that absorption of NCO in IR was completely disappeared. Dibutyl hydroxy toluene (0.05 g) was added, and HCFC 225 was completely removed by an evaporator.

Comparative Examples 2-3

The compositions of Comparative Examples 2-3 were prepared similarly to Example 1 except that the use amount of the agents was changed as shown in the following table.

Comparative Example 2

TABLE 15

| SUMIDUR N3300 | 14.2 g |
|---|---|
| HCFC225 (for dissolving SUMIDUR) | 85.3 g |
| dibutyltin dilaurate | 0.03 g |
| PFPE alcohol | 70.0 g |
| HCFC225 (for dissolving PFPE alcohol) | 70.0 g |
| X-22-170BX in place of SILAPLANE | 23.0 g |
| HCFC225 (for dissolving X-22-170BX) | 23.0 g |
| Light ester HOA | 4.8 g |
| dibutyl hydroxy toluene | 0.05 g |

Comparative Example 3

TABLE 16

| SUMIDUR N3300 | 18.3 g |
|---|---|
| HCFC225 (for dissolving SUMIDUR) | 109.7 g |
| dibutyltin dilaurate | 0.04 g |

TABLE 16-continued

| PFPE alcohol | 15.0 g |
|---|---|
| HCFC225 (for dissolving PFPE alcohol) | 15.0 g |
| X-22-170BX | 88.6 g |
| HCFC225 (for dissolving X-22-170BX) | 88.6 g |
| Light ester HOA | 6.7 g |
| dibutyl hydroxy toluene | 0.05 g |

The number average molecular weight of component (B1) and (B2) and a ratio (a molar ratio) of component (B1), component (B2) and component (B3) with respect to 9 moles of the isocyanate group in component (A) in Comparative Examples 1-3 are shown in the following table.

TABLE 17

|  | Number average molecular weight | | B1/B2/B3 (molar ratio) |
|---|---|---|---|
|  | Component (B1) | Component (B2) |  |
| Comparative Example 1 | 2,658 | none | 1/0/8 |
| Comparative Example 2 | 2,658 | 2,800 | 3/1/5 |
| Comparative Example 3 | 2,658 | 2,800 | 0.5/3/5.5 |

Text Example 1

Solubility Examination

Each of the compositions obtained in Examples 1-11 and Comparative Examples 1-3 was added to methyl ethyl ketone (MEK), methyl isobutyl ketone (MIBK), ethyl acetate and butyl acetate such that the concentration of the solid was 20% by mass, and stirred at 25° C. for 60 minutes.

The obtained solutions were observed, and solubility was determined based on the following criteria.

⊚—clear and colorless

◯—dissolved, but slightly cloudy

×—producing precipitate

TABLE 18

|  | Ketone solvent | | | Esther solvent | |
|---|---|---|---|---|---|
|  | Acetone | MEK | MIBK | Ethyl acetate | Butyl acetate |
| Example 1 | ⊚ | ⊚ | ⊚ | ⊚ | ⊚ |
| Example 2 | ⊚ | ⊚ | ⊚ | ⊚ | ⊚ |
| Example 3 | ◯ | ◯ | ◯ | ◯ | ◯ |
| Example 4 | ⊚ | ⊚ | ⊚ | ⊚ | ⊚ |
| Example 5 | ⊚ | ⊚ | ⊚ | ⊚ | ⊚ |
| Example 6 | ⊚ | ⊚ | ⊚ | ⊚ | ⊚ |
| Example 7 | ⊚ | ⊚ | ⊚ | ⊚ | ⊚ |
| Example 8 | ◯ | ◯ | ◯ | ◯ | ◯ |
| Example 9 | ◯ | ◯ | ◯ | ◯ | ◯ |
| Example 10 | ⊚ | ⊚ | ◯ | ⊚ | ◯ |
| Example 11 | ⊚ | ⊚ | ⊚ | ⊚ | ⊚ |
| Comparative Example 1 | X | X | X | X | X |
| Comparative Example 2 | X | X | X | X | X |
| Comparative Example 3 | X | X | X | X | X |

Text Example 2

Function Examination

Formation of Surface Treating Layer

Each of the compositions (0.05 g) obtained in Examples 1-15 was added to a hard coating agent (Beam set 575CB (trade name), Arakawa Chemical Industry Co., Ltd., 9.95 g) and dissolved in methyl isobutyl ketone (15 g) to obtain 40% by mass of the curable composition. A polycarbonate substrate (Stella, manufactured by Nippon Testpanel Co., Ltd) was immersed in the obtained curable composition, and dried at 70° C. for 5 minutes. Then, 500 mJ/cm$^2$ of ultraviolet was irradiated to form the surface treatment layer.

The composition (2 g) obtained in Comparative Example 1 was dissolved in ZEORORA (registered trademark) H (manufactured by Nippon ZEON Corporation, 5 g) and propylene glycol monomethylether (3 g). The solution (0.5 g) was added to a hard coating agent (Beam set 575CB (trade name), Arakawa Chemical Industry Co., Ltd., 9.9 g), and dissolved in propylene glycol monomethylether (14.6 g) to obtain 40% by mass of the curable composition.

Evaluation

Evaluation of Contact Angle

Static contact angles of water and n-hexadecane (water contact angle and n-hexadecane contact angle) were measured for 1 μL or 2 μL respectively by using a contact angle measuring instrument (manufactured by KYOWA INTERFACE SCIENCE Co., Ltd., "DropMaster"). The results are shown in Table 20 below.

Evaluation of Surface Slip Property

Coefficient of dynamic friction was measured by using a surface texture measurement instrument (FPT-F1; manufactured by Labthink Instrument Co. Ltd.) using a paper as a friction probe according to ASTM D4917. The results are shown in Table 20 below.

Evaluation of Transparency

Total light transmittance and haze were measured by using HAZE-GARDII (manufactured by Toyo Seiki Seisaku-Sho, Ltd.). The results are shown in Table 20 below.

Evaluation of Repelling Property and Wiping Property of an Oil-based Ink

A line was drawn on the surface-treating layer with an oil pen (Mckee (trade name), manufactured by Zebra Co., Ltd.), and the repelling property and the state of the surface-treating layer after allowing the surface-treating layer to stand for one minute and wiping the adhered ink three times with Kimwipe (trade name, manufactured by Jujo-Kimberly Co., Ltd) were visually evaluated.

Evaluation criteria are as follows.

TABLE 19

| | Repelling property | Wiping property |
|---|---|---|
| ◎ | extremely repel | easily wipeable |
| ○ | repel | wipeable |
| X | not repel | not wipeable |

The above results are shown in Table 20.

TABLE 20

| | Total light transmittance | Haze | Contact angle water | Contact angle n-hexadecane | Coefficient of dynamic friction | Oil-based ink Repelling property | Oil-based ink Wiping property | Durability |
|---|---|---|---|---|---|---|---|---|
| Example 1 | 92.5 | 0.31 | 107 | 64 | 0.052 | ○ | ◎ | 15,000 |
| Example 2 | 92.4 | 0.31 | 109 | 64 | 0.063 | ○ | ◎ | 13,000 |
| Example 3 | 92.5 | 0.35 | 107 | 64 | 0.073 | ○ | ◎ | 13,000 |
| Example 4 | 92.3 | 0.32 | 106 | 61 | 0.053 | ○ | ◎ | 14,000 |
| Example 5 | 92.4 | 0.31 | 107 | 65 | 0.063 | ○ | ◎ | 18,000 |
| Example 6 | 92.6 | 0.40 | 109 | 65 | 0.075 | ○ | ◎ | 12,000 |
| Example 7 | 92.6 | 0.31 | 110 | 65 | 0.045 | ○ | ◎ | 15,000 |
| Example 8 | 92.3 | 0.41 | 106 | 63 | 0.060 | ○ | ◎ | 14,000 |
| Example 9 | 92.5 | 0.55 | 110 | 65 | 0.045 | ○ | ◎ | 15,000 |
| Example 10 | 92.2 | 0.32 | 108 | 63 | 0.051 | ○ | ◎ | 18,000 |
| Example 11 | 92.6 | 0.35 | 109 | 63 | 0.058 | ○ | ◎ | 20,000 |
| Example 12 | 92.3 | 0.41 | 109 | 66 | 0.074 | ○ | ◎ | 14,000 |
| Example 13 | 92.3 | 0.37 | 109 | 62 | 0.023 | ○ | ◎ | 12,000 |
| Example 14 | 92.7 | 0.31 | 106 | 62 | 0.070 | ○ | ◎ | 15,000 |
| Example 15 | 92.1 | 0.29 | 107 | 64 | 0.062 | ○ | ◎ | 18,000 |
| Comparative Example 1 | 92.5 | 0.35 | 107 | 65 | 0.120 | ○ | ○ | 4,000 |

Evaluation of Friction Durability

A cotton friction durability evaluation was performed as a friction durability evaluation. Specifically, the base material on which the surface treating layer was formed was horizontally arranged, and then, a cotton (BEMCOT (registered trademark) M3-II) was contacted with the exposed surface of the surface treating layer and a load of 500 g/cm$^2$ was applied thereon. Then, the cotton was shuttled at a rate of 140 mm/second while applying the load. The static contact angle of water (water contact angle) was measured every 100 shuttles. The number of friction times was decided the durable times for friction at the point that the measured value of the contact angle became to be 100 degree or less. The results are shown in Table 20 below.

As seen from Table 18 and Table 20, Examples 1-11 in which the molar amounts of component (B1), component (B2) and component (B3) were within the following range:
component (B1) 0.1-2 moles,
component (B2) 0.05-2 moles, and
component (B3) 5-8.85 moles
with respect to 9 moles of the isocyanate group in component (A) were dissolved in the ketone solvent and the ester solvent. In particular, it was confirmed that Examples 1, 2, 4-7 and 11 were completely dissolved. On the other hand, it was confirmed that Comparative Examples 1-3 in which the ratio was not within the above range were not dissolved in the ketone solvent and the ester solvent. Similarly, in the evaluation of wiping property of an oil-based ink, Examples 1-15 showed good wiping property while Comparative Examples showed less wiping property in comparison with Examples.

Industrial Applicability

The present invention is suitably applied for forming a surface treating layer on a surface of various base materials.

The present invention includes the following embodiments:

Embodiment 1. A composition comprising a compound containing a carbon-carbon double bond obtained by reacting
(A) a polyisocyanate which is a trimer of diisocyanate, with
(B) a compound having an active hydrogen,
wherein
component (B) comprises:
(B1) a perfluoropolyether having an active hydrogen,
(B2) a silane compound having an active hydrogen, and
(B3) a monomer having an active hydrogen and a carbon-carbon double bond
a molar amount of an isocyanate group in component (A) is equal to a total molar amount of component (B), and a molar amount of component (B1), component (B2) and component (B3) per 9 moles of the isocyanate group in component (A) are
component (B1) 0.1-2 moles,
component (B2) 0.05-2 moles, and
component (B3) 5-8.85 moles, respectively.

Embodiment 2. The composition according to Embodiment 1 wherein component (A) is an isocyanurate type polyisocyanate.

Embodiment 3. The composition according to Embodiment 1 or 2 wherein component (B1) is at least one compound of any one of the following general formulae (B1-i) and (B1-ii):

$$Rf\text{—}PFPE\text{-}R^1\text{—}CH_2OH \quad (B1\text{-i})$$

$$HOCH_2\text{—}R^1\text{—}PFPE\text{-}R^1\text{—}CH_2OH \quad (B1\text{-ii})$$

wherein
Rf is an alkyl group having 1-16 carbon atoms which may be substituted by one or more fluorine atoms;
PFPE is a group of the general formula:

wherein a, b, c and d are each independently an integer of 0-200, the sum of a, b, c and d is at least one, and the occurrence order of the respective repeating units in parentheses with the subscript a, b, c or d is not limited in the formula; and
$R^1$ is each independently a group of the following formula:

wherein Y is an oxygen atom or a divalent polar group, f, g and h are each independently an integer of 0-50, the sum of f, g and h is at least one, and the occurrence order of the respective repeating units in parentheses is not limited in the formula.

Embodiment 4. The composition according to Embodiment 3 wherein component (B1) is at least one compound of the general formula (B1-i).

Embodiment 5. The composition according to Embodiment 3 or 4 wherein

PFPE is a group of any one of the formulae (i)-(iii):

 (i)

wherein b is an integer of 1-200,

 (ii)

wherein b is an integer of 1-200,

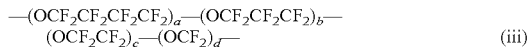 (iii)

wherein a and b are each independently 0 or an integer of 1-30, c and d are each independently an integer of 1-200, and the occurrence order of the respective repeating units in parentheses with the subscript a, b, c or d is not limited in the formula.

Embodiment 6. The composition according to any one of Embodiments 1-5 wherein component (B2) is at least one compound for the general formula:

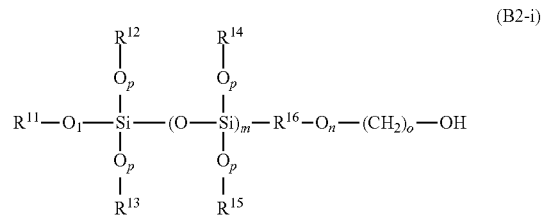 (B2-i)

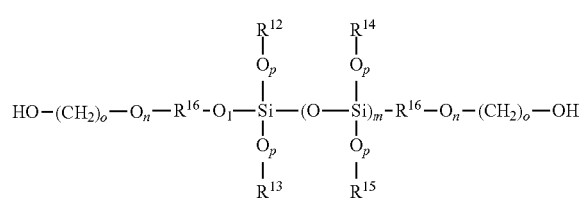 (B2-ii)

wherein $R^{11}$, $R^{12}$, $R^{13}$, $R^{14}$ and $R^{15}$ are each independently an alkyl group or an aryl group;
$R^{16}$ is a divalent organic group;
l and n are each independently 0 or 1;
m is an integer of 1-500;
o is an integer of 0-20; and
p is 0 or 1.

Embodiment 7. The composition according to any one of Embodiments 1-6 wherein component (B3) is a compound containing a (meth)acrylate group.

Embodiment 8. The composition according to any one of Embodiments 1-7 wherein component (B3) is at least one compound selected from the group consisting of

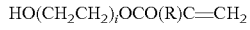

wherein a hydrogen atom, a chlorine atom, a fluorine atom, or an alkyl group having 1-10 carbon atoms which may be substituted by a fluorine atom, and i is 2-10, for example, 2-2-hydroxyethyl(meth)acrylate, 4-hydroxybutyl(meth)acrylate;

wherein R is a hydrogen atom, a chlorine atom, a fluorine atom, or n alkyl group having 1-10 carbon atoms which may be substituted by a fluorine atom;

wherein R is a hydrogen atom, a chlorine atom, a fluorine atom, or an alkyl group having 1-10 carbon atoms which may be substituted by a fluorine atom;

wherein R is a hydrogen atom, a chlorine atom, a fluorine atom, or an alkyl group having 1-10 carbon atoms which may be substituted by a fluorine atom;

HOCH$_2$C(CH$_2$OCO(R)C=CH$_2$)$_3$ wherein R is a hydrogen atom, a chlorine atom, a fluorine atom, or an alkyl group having 1-10 carbon atoms which may be substituted by a fluorine atom;

C(CH$_2$OCO(R)C=CH$_2$)$_3$CH$_2$OCH$_2$C(CH$_2$OCO(R)C=CH$_2$)$_2$CH$_2$OH wherein R is a hydrogen atom, a chlorine atom, a fluorine atom, or an alkyl group having 1-10 carbon atoms which may be substituted by a fluorine atom;

HOCH$_2$CH$_2$OCOC$_6$H$_5$OCOCH$_2$CH$_2$OCO(R)C=CH$_2$ wherein R is a hydrogen atom, a chlorine atom, a fluorine atom, or an alkyl group having 1-10 carbon atoms which may be substituted by a fluorine atom;

H(OCH$_2$CH$_2$)$_n$OCO(R)C=CH$_2$ wherein n is 1-30, and R is a hydrogen atom, a chlorine atom, a fluorine atom, or an alkyl group having 1-10 carbon atoms which may be substituted by a fluorine atom;

H(OCH(CH$_3$)CH$_2$)$_n$OCO(R)C=CH$_2$ wherein n is 1-30, and R is a hydrogen atom, a chlorine atom, a fluorine atom, or an alkyl group having 1-10 carbon atoms which may be substituted by a fluorine atom;

an allylalcohol;

HO(CH$_2$)$_k$CH=CH$_2$ wherein k is 2-20;

(CH$_3$)$_3$SiCH(OH)CH=CH$_2$; and styrylphenol.

Embodiment 9. The composition according to any one of Emboidments 1-8 wherein the reaction of component (A) with component (B) is conducted by reacting a portion of the isocyanate group component (A) with component (B1) and component (B2), and then the rest of the isocyanate group with component (B3).

Embodiment 10. The composition according to any one of Embodiments 1-8, obtained by reacting component (A) with component (B1) and (B3) to provide the first composition,
reacting component (A) with component (B2) and (B3) to provide the second composition,
and then, mixing the first composition and the second composition.

Embodiment 11. The composition according to Embodiment 10, obtained by reacting component (A) with component (B1) followed by component (B3) to provide the first composition,
by reaction component (A) with component (B2) and then component (B3) to provide the second composition.

Embodiment 12. The composition according to any one of Embodiments 1-11, comprising at least one fluorine-containing oil of the following general formula (C):

Rf$^1$—PFPE-Rf$^2$ (C)

wherein:
Rf$^1$ is an alkyl group having 1-16 carbon atoms which may be substituted by one or more fluorine atoms;

Rf$^2$ is a hydrogen atom, a fluorine atom, or an alkyl group (for example, straight or branched) having 1-16 carbon atoms which may be substituted by one or more fluorine atoms; and PFPE is a group of the general formula:

—(OC$_4$F$_8$)$_{a'}$—(OC$_3$F$_6$)$_{b'}$—(OC$_2$F$_4$)$_{c'}$—(OCF$_2$)$_{d'}$— wherein a', b', c' and d' are each independently an integer of 0-200, the sum of a', b', c' and d' is at least one, and the occurrence order of the respective repeating units in parentheses with the subscript a', b', c' or d' is not limited in the formula.

Embodiment 13. A surface treatment composition comprising one or more compositions according to any one of Embodiments 1-12.

Embodiment 14. The surface treatment composition according to Embodiment 13, comprising a solvent of 5-10,000 parts by mass with respect to the total 100 parts by mass of the composition according to any one of claims 1-12.

Embodiment 15. The surface treatment composition according to Embodiment 14 wherein the solvent is a fluorine-free organic solvent.

Embodiment 16. The surface treatment composition according to Embodiment 14 wherein the solvent is a mixed solvent of a fluorine-free organic solvent and a fluorine-containing organic solvent.

Embodiment 17. The surface treatment composition according to any one of Embodiments 13-16, comprising an active energy curing initiator.

Embodiment 18. A curable composition comprising
one or more compositions according to any one of Embodiments 1-12; and
a matrix forming composition.

Embodiment 19. The curable composition according to claim 18 comprising a solvent of 0-19,900 parts by mass with respect to the total 100 parts by mass of the composition according to any one of Embodiments 1-12 and the matrix forming composition.

Embodiment 20. The curable composition according to Embodiment 19 wherein the solvent is a fluorine-free organic solvent.

Embodiment 21. The curable composition according to Embodiment 19 wherein the solvent is a mixed solvent of a fluorine-free organic solvent and a fluorine-containing organic solvent.

Embodiment 22. The curable composition according to any one of Embodiments 18-21 comprising an active energy curing initiator.

Embodiment 23. The curable composition according to any one of Embodiments 18-22 comprising the composition according to any one of claims 1-12 of 0.01-10% by mass with respect to the total of the matrix forming composition and the composition according to any one of claims 1-12.

Embodiment 24. An article comprising a base material and a layer which is formed on a surface of the base material from the surface treatment composition according to any one of claims 13-17 or the curable composition according to any one of Embodiments 18-23.

Embodiment 25. The article according to Embodiment 24 which is an optical member.

The invention claimed is:
1. A composition comprising a reaction product containing a carbon-carbon double bond obtained by reacting
(A) a polyisocyanate which is a trimer of diisocyanate, with

(B) a compound having an active hydrogen,
wherein
component (B) comprises:
(B1) a perfluoropolyether having an active hydrogen,
(B2) a silane compound or a siloxane compound having an active hydrogen, and
(B3) a monomer having an active hydrogen and a carbon-carbon double bond
a molar amount of an isocyanate group in component (A) is equal to a total molar amount of component (B), and a molar amount of component (B1), component (B2) and component (B3) per 9 moles of the isocyanate group in component (A) are
component (B1) 0.1-2 moles,
component (B2) 0.05-2 moles, and
component (B3) 5-8.85 moles, respectively, and
a ratio of a number average molecular weight of component (B1) to (B2) is 1:3-3:1.

2. The composition according to claim 1 wherein component (A) is an isocyanurate type polyisocyanate.

3. The composition according to claim 1 wherein component (B1) is at least one compound of any one of the following general formulae (B1-i) and (B1-ii):

(B1-i)

(B1-ii)

wherein
Rf is an alkyl group having 1-16 carbon atoms which may be substituted by one or more fluorine atoms;
PFPE is a group of the general formula:

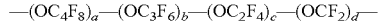

wherein a, b, c and d are each independently an integer of 0-200, the sum of a, b, c and d is at least one, and the occurrence order of the respective repeating units in parentheses with the subscript a, b, c or d is not limited in the formula; and
$R^1$ is each independently a group of the following formula:

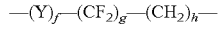

wherein Y is an oxygen atom or a divalent polar group, f, g and h are each independently an integer of 0-50, the sum of f, g and h is at least one, and the occurrence order of the respective repeating units in parentheses is not limited in the formula.

4. The composition according to claim 3 wherein component (B1) is at least one compound of the general formula (B1-i).

5. The composition according to claim 3 wherein PFPE is a group of any one of the formulae (i)-(iii):

(i)
wherein b is an integer of 1-200,

(ii)
wherein b is an integer of 1-200,

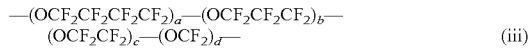
(iii)

wherein a and b are each independently 0 or an integer of 1-30, c and d are each independently an integer of 1-200, and the occurrence order of the respective repeating units in parentheses with the subscript a, b, c or d is not limited in the formula.

6. The composition according to claim 1 wherein component (B2) is at least one compound for the general formula:

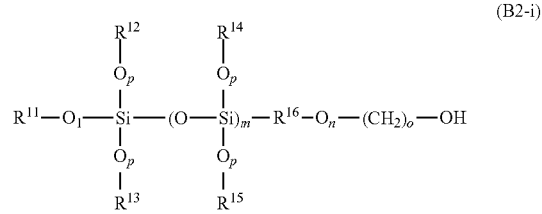
(B2-i)

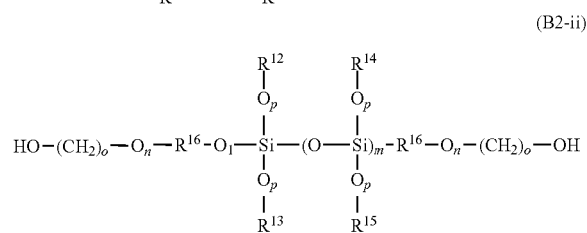
(B2-ii)

wherein $R^{11}$, $R^{12}$, $R^{13}$, $R^{14}$ and $R^{15}$ are each independently an alkyl group or an aryl group;
$R^{16}$ is a divalent organic group;
l and n are each independently 0 or 1;
m is an integer of 1-500;
o is an integer of 0-20; and
p is 0 or 1.

7. The composition according to claim 1 wherein component (B3) is a compound containing a (meth)acrylate group.

8. The composition according to claim 1 wherein component (B3) is at least one compound selected from the group consisting of

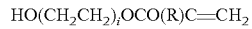

wherein R is a hydrogen atom, a chlorine atom, a fluorine atom, or an alkyl group having 1-10 carbon atoms which may be substituted by a fluorine atom, and i is 2-10;

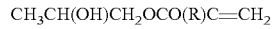

wherein R is a hydrogen atom, a chlorine atom, a fluorine atom, or n alkyl group having 1-10 carbon atoms which may be substituted by a fluorine atom;

wherein R is a hydrogen atom, a chlorine atom, a fluorine atom, or an alkyl group having 1-10 carbon atoms which may be substituted by a fluorine atom;

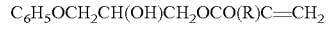

wherein R is a hydrogen atom, a chlorine atom, a fluorine atom, or an alkyl group having 1-10 carbon atoms which may be substituted by a fluorine atom;

wherein R is a hydrogen atom, a chlorine atom, a fluorine atom, or an alkyl group having 1-10 carbon atoms which may be substituted by a fluorine atom;

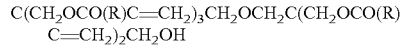

wherein R is a hydrogen atom, a chlorine atom, a fluorine atom, or an alkyl group having 1-10 carbon atoms which may be substituted by a fluorine atom;

$HOCH_2CH_2OCOC_6H_5OCOCH_2CH_2OCO(R)C=CH_2$ wherein R is a hydrogen atom, a chlorine atom, a fluorine atom, or an alkyl group having 1-10 carbon atoms which may be substituted by a fluorine atom;

$H(OCH_2CH_2)_nOCO(R)C=CH_2$ wherein n is 1-30, and R is a hydrogen atom, a chlorine atom, a fluorine atom, or an alkyl group having 1-10 carbon atoms which may be substituted by a fluorine atom;

$H(OCH(CH_3)CH_2)_nOCO(R)C=CH_2$ wherein n is 1-30, and R is a hydrogen atom, a chlorine atom, a fluorine atom, or an alkyl group having 1-10 carbon atoms which may be substituted by a fluorine atom;

an allylalcohol;

$HO(CH_2)_kCH=CH_2$ wherein k is 2-20;

$(CH_3)_3SiCH(OH)CH=CH_2$; and styrylphenol.

9. The composition according to claim 1 wherein the reaction of component (A) with component (B) is conducted by reacting a portion of the isocyanate group component (A) with component (B1) and component (B2), and then the rest of the isocyanate group with component (B3).

10. The composition according to claim 1, obtained by reacting component (A) with component (B1) and (B3) to provide the first composition, reacting component (A) with component (B2) and (B3) to provide the second composition, and then, mixing the first composition and the second composition.

11. The composition according to claim 10, obtained by reacting component (A) with component (B1) followed by component (B3) to provide the first composition, by reaction component (A) with component (B2) and then component (B3) to provide the second composition.

12. The composition according to claim 1, comprising at least one fluorine-containing oil of the following general formula (C):

$Rf^1-PFPE-Rf^2$     (C)

wherein:

$Rf^1$ is an alkyl group having 1-16 carbon atoms which may be substituted by one or more fluorine atoms;

$Rf^2$ is a hydrogen atom, a fluorine atom, or an alkyl group having 1-16 carbon atoms which may be substituted by one or more fluorine atoms; and PFPE is a group of the general formula:

$-(OC_4F_8)_{a'}-(OC_3F_6)_{b'}-(OC_2F_4)_{c'}-(OCF_2)_{d'}-$ wherein a', b', c' and d' are each independently an integer of 0-200, the sum of a', b', c' and d' is at least one, and the occurrence order of the respective repeating units in parentheses with the subscript a', b', c' or d' is not limited in the formula.

13. A surface treatment composition comprising one or more compositions according to claim 1.

14. The surface treatment composition according to claim 13, comprising a solvent of 5-10,000 parts by mass with respect to the total 100 parts by mass of the composition according to claim 1.

15. The surface treatment composition according to claim 14 wherein the solvent is a fluorine-free organic solvent.

16. The surface treatment composition according to claim 14 wherein the solvent is a mixed solvent of a fluorine-free organic solvent and a fluorine-containing organic solvent.

17. The surface treatment composition according to claim 13, comprising an active energy curing initiator.

18. A curable composition comprising
a composition according to claim 1; and
a matrix forming composition.

19. The curable composition according to claim 18 comprising a solvent of 0-19,900 parts by mass with respect to the total 100 parts by mass of the composition.

20. The curable composition according to claim 19 wherein the solvent is a fluorine-free organic solvent.

21. The curable composition according to claim 19 wherein the solvent is a mixed solvent of a fluorine-free organic solvent and a fluorine-containing organic solvent.

22. The curable composition according to claim 18 comprising an active energy curing initiator.

23. The curable composition according to claim 18 comprising the composition according to claim 1 of 0.01-10% by mass with respect to the total of the matrix forming composition and the composition according to claim 1.

24. An article comprising a base material and a layer which is formed on a surface of the base material from the surface treatment composition according to claim 13.

25. The article according to claim 24 which is an optical member.

26. An article comprising a base material and a layer which is formed on a surface of the base material from the curable composition according to claim 18.

\* \* \* \* \*